US012722032B2

(12) United States Patent
Corletto et al.

(10) Patent No.: US 12,722,032 B2
(45) Date of Patent: Sep. 1, 2026

(54) FIRE SUPPRESSION COMPOSITION AND METHOD OF ENCAPSULATION, THERMAL RUNAWAY PREVENTION

(71) Applicants: Jesse W. Corletto, Reno, NV (US); Rory Chelsey Patrick Millikin, Kelowna (CA)

(72) Inventors: Jesse W. Corletto, Reno, NV (US); Rory Chelsey Patrick Millikin, Kelowna (CA)

(73) Assignee: E-Firex, Reno, NV (US)

( * ) Notice: Subject to any disclaimer, the term of this patent is extended or adjusted under 35 U.S.C. 154(b) by 570 days.

(21) Appl. No.: 18/229,157

(22) Filed: Aug. 1, 2023

(65) Prior Publication Data

US 2024/0366983 A1 Nov. 7, 2024

Related U.S. Application Data

(63) Continuation-in-part of application No. 18/143,590, filed on May 4, 2023, now Pat. No. 11,944,858.

(51) Int. Cl.
*A62D 1/02* (2006.01)
*A62C 3/16* (2006.01)
*A62C 99/00* (2010.01)

(52) U.S. Cl.
CPC .............. *A62D 1/0071* (2013.01); *A62C 3/16* (2013.01); *A62C 99/0045* (2013.01)

(58) Field of Classification Search
CPC ...... A62D 1/0042; A62C 3/16; A62C 99/0045
See application file for complete search history.

(56) References Cited

U.S. PATENT DOCUMENTS

| | | | |
|---|---|---|---|
| 3,238,129 | A | 3/1966 | Veltman et al. |
| 4,130,687 | A | 12/1978 | Ballard et al. |
| 4,269,628 | A | 5/1981 | Ballard et al. |
| 4,780,147 | A | 10/1988 | Ou et al. |
| 8,869,477 | B2 | 10/2014 | Ha et al. |
| 9,097,016 | B2 | 8/2015 | Propst |
| 9,321,243 | B2 | 4/2016 | Fernando et al. |

(Continued)

FOREIGN PATENT DOCUMENTS

| | | | |
|---|---|---|---|
| CA | 1091862 | A | 12/1980 |
| EP | 2045227 | B1 | 4/2009 |

OTHER PUBLICATIONS ("Modification of the Thermally Exfoliated Vermiculite by Sonication and Grafting Methods" Journal of New Technology and Materials vol. 06, No. 02 (2016) pp. 72-80 (Year: 2016).*

*Primary Examiner* — Andrew J. Oyer
(74) *Attorney, Agent, or Firm* — Christopher Pilling

(57) ABSTRACT

A fire suppression composition and method of encapsulation, thermal runaway prevention is provided. The fire suppression composition includes exfoliated vermiculite mixed with a liquid propellant, wherein the composition is chemical free, non-toxic, and biodegradable. Performance additives may be optionally added to improve the performance of the fire suppression composition. The fire suppression composition is intended for a variety of uses, and fire fighting systems. Although it may be used to fight a variety of fires, it is particularly useful for lithium ion battery fires. The exfoliated vermiculite is configured to encapsulate the object or substrate on fire, preventing thermal runaway and escalating fire situations.

8 Claims, 7 Drawing Sheets

(56) References Cited

U.S. PATENT DOCUMENTS

| | | | |
|---|---|---|---|
| 9,708,052 | B2 | 7/2017 | Contzen et al. |
| 9,725,365 | B1 | 8/2017 | Zubrod |
| 9,840,851 | B2 | 12/2017 | Propst |
| 9,850,429 | B2 | 12/2017 | Laoutid et al. |
| 9,932,269 | B2 | 4/2018 | Zubrod |
| 10,092,946 | B2 | 10/2018 | Bartels et al. |
| 10,158,102 | B2 | 12/2018 | Wu et al. |
| 10,450,752 | B2 | 10/2019 | Paradis et al. |
| 10,569,116 | B2 | 2/2020 | Goodwin et al. |
| 10,913,743 | B2 | 2/2021 | Pfaendner et al. |
| 2004/0226100 | A1 | 11/2004 | Small et al. |
| 2019/0337861 | A1 | 11/2019 | Uthe et al. |
| 2021/0060816 | A1 | 3/2021 | Yu et al. |

* cited by examiner

FIRE SUPPRESSION COMPOSITION AND METHOD OF ENCAPSULATION, THERMAL RUNAWAY PREVENTION

CROSS-REFERENCE TO RELATED APPLICATIONS

The present invention is a continuation in part application to U.S. utility patent application Ser. No. 18/143,590 filed May 4, 2023 entitled "FIRE SUPPRESSION COMPOSITION AND METHOD OF ENCAPSULATION, THERMAL RUNAWAY PREVENTION" which is a continuation in part application to U.S. utility patent application Ser. No. 17/991,667 filed Nov. 21, 2022 entitled "BATTERY FIRE SUPPRESSION COMPOSITION, METHOD OF MANUFACTURE, AND OF USE", each are hereby incorporated in their entirety at least by reference.

BACKGROUND OF THE INVENTION

1. Field of the Invention

The present invention relates in general to fire suppression systems, but more particularly to a fire suppression composition and method of encapsulation, thermal runaway prevention.

2. Description of Related Art

Lithium-ion battery fires are becoming an increasing occurrence, due to the amount of consumer products containing one or more lithium-ion batteries. An existing approach to suppress lithium-ion battery fires is to use water to suppress the fire until the lithium-ion battery fire is completely out. This can take from one hour to half of a day, depending on the amount of cooling the thermal runaway needs. Additionally, as reported on page 45 of the Lithium-Ion Batteries Hazard and Use Assessment Final Report by The Fire Protection Research Foundation (dates July 2011), "[E]xponent is not aware of any fire protection standards specific to lithium-ion cells." With lithium-ion batteries becoming more common in EV vehicles and electronic consumer products, the frequency and resulting harm caused by lithium-ion battery fires will increase. Consequently, the present invention provides a fire suppression system and method configured for suppression and encapsulation of various materials, including lithium-ion batteries.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a particular object of the invention to provide a fire suppression composition configured to encapsulate an object during fire fighting, preventing thermal runaway. It is another object of the invention, for the fire suppression composition to be environmentally friendly, non-hazardous, chemical-free, non-toxic, biodegradable, and free of carcinogens.

In order to do so, a fire suppression composition is provided, comprising thermally exfoliated vermiculite; and, a liquid propellent; wherein the fire suppression composition is chemical free and biodegradable.

In one embodiment, the fire suppression composition comprises 5-20% thermally exfoliated vermiculite and 80-95% liquid propellant by weight. In one embodiment, the liquid propellant is water. In another embodiment, a chemical free adhesive is provided, wherein the adhesive is configured to reduce an amount of thermally exfoliated vermiculite needed for the composition. In this embodiment, the fire suppression composition comprises 1-10% thermally exfoliated vermiculite and 90-99% liquid propellant by weight. In one embodiment, the fire suppression composition is configured to be held within a fire extinguisher tank or a tank positioned in a vehicle. In yet another embodiment, a stabilizing resin is provided, wherein the stabilizing resin is chemical free, non-toxic, non-flammable, and biodegradable.

In another aspect of the invention, a method of extinguishing a fire via encapsulation to prevent thermal runaway is provided, the method comprising steps: (a) providing a tank containing a fire suppression composition comprising vermiculite, a liquid propellent, and an additive, the composition having foam consistency, wherein the fire suppression composition is chemical free and biodegradable; (b) releasing, via a nozzle in fluid connection with the tank, the fire suppression composition upon an object on fire at a distance, wherein the liquid propellent and nozzle aid in the distance the vermiculite may travel; (c) binding, via the foam consistency, the fire suppression suppression composition to the object; and, (e) expanding, via the fire's heat, the vermiculite such that the vermiculite encapsulates the object to prevent thermal runaway.

In one embodiment, the object is a lithium-ion battery. In one embodiment, the liquid propellant is water. In one embodiment, the vermiculite is thermally exfoliated. In another embodiment, the fire suppression composition comprises 1-20% vermiculite and 80-99% liquid propellant by weight. In yet another embodiment, the fire suppression composition further comprises an adhesive which aids in the binding of step (c), wherein the adhesive is chemical free. In yet another embodiment, the fire suppression composition further comprises a stabilizing resin, wherein the stabilizing resin is chemical free, non-toxic, non-flammable, and biodegradable. In one embodiment, the nozzle is a smooth jet aeration nozzle. In one embodiment, the additive is a foaming agent.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a fire suppression composition and method of encapsulation, thermal runaway prevention.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1:
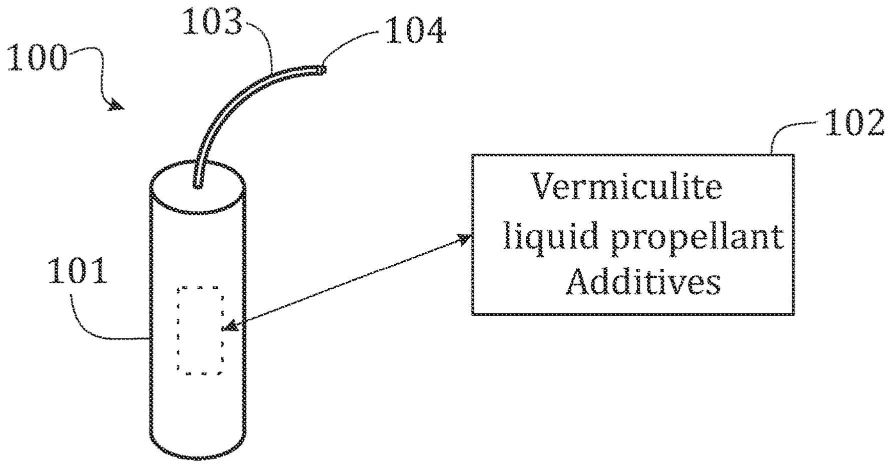
FIG. 1 is a fire suppression composition within a fire extinguishing system according to an embodiment of the present invention.

FIG. 1 is a fire suppression composition within a fire extinguishing system 100 according to an embodiment of the present invention. Referring now to FIG. 1, the system includes a fire suppression tank 101 configured to hold a fire suppression composition 102. In one embodiment, the fire suppression tank 101 is a fire extinguisher tank as well known in the art. In alternative embodiments, the fire suppression tank may be within a vehicle, such as a firetruck, airplane, or similar. In embodiments wherein the system and tank is a fire extinguisher, a conduit or hose 103 is provided. The conduit or hose is configured to enable the fire suppression composition within the tank to dispense or release via a nozzle 104 positioned at the distal end of the hose. It should be understood that a similar configuration of components may also be provided if the fire suppression tank is within a vehicle, such as a firetruck, or the fire suppression composition may be dumped directly via a door-system as commonly used on fire suppression airplanes as well known the art. Further, the tank may be provided within a restaurant kitchen fire suppression system, or other commercial and residential applications. For simplicity, the disclosure illustrates the fire suppression system using a fire extinguisher, however should be construed as a non-limiting example. Depending on the tank, compressed air, such as CO2 or similar, may be used as a propellant of the fire suppression composition.

Still referring to FIG. 1, in one embodiment, the fire suppression composition 102 comprises vermiculite, a liquid propellant, and additives. In other embodiments, the fire suppression composition 102 consists only of vermiculite and a liquid propellant. In a preferred embodiment, the liquid propellant is water. During use, the liquid propellant is configured to propel the other composition matter (vermiculite and the optional additives) a distance towards an object or substance on fire for extinguishing which will be discussed in further details below.

Figure 2A:
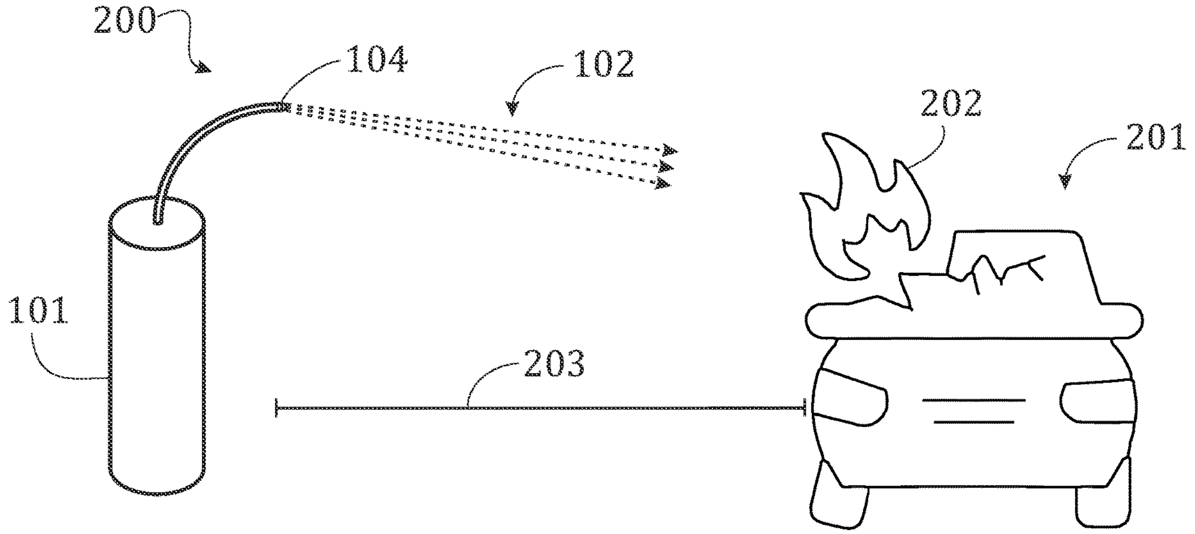
FIGS. 2A-C illustrates a method of encapsulation, thermal runaway prevention according to an embodiment of the present invention.
Figure 2B:
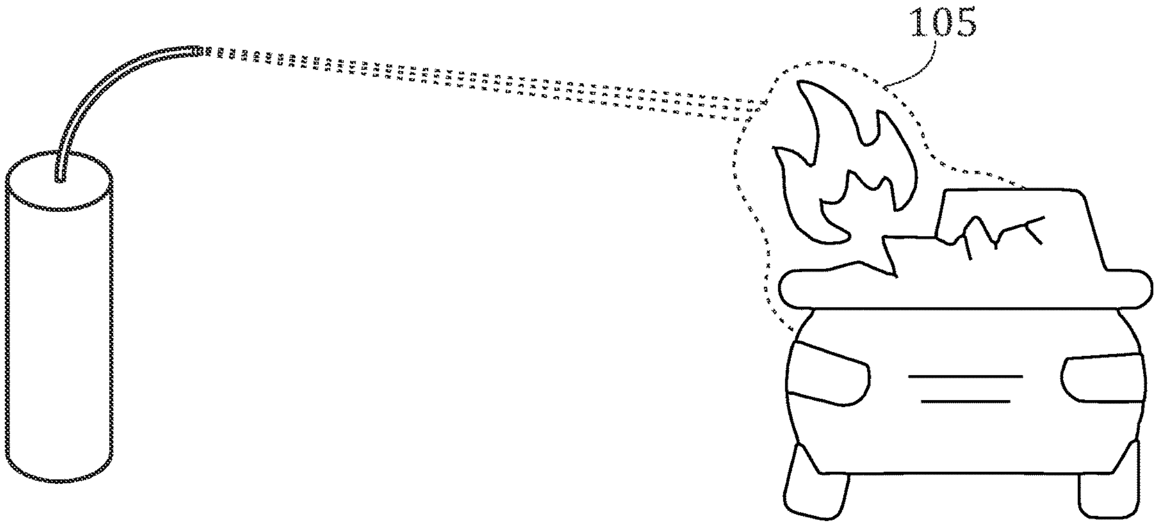
Figure 2C:
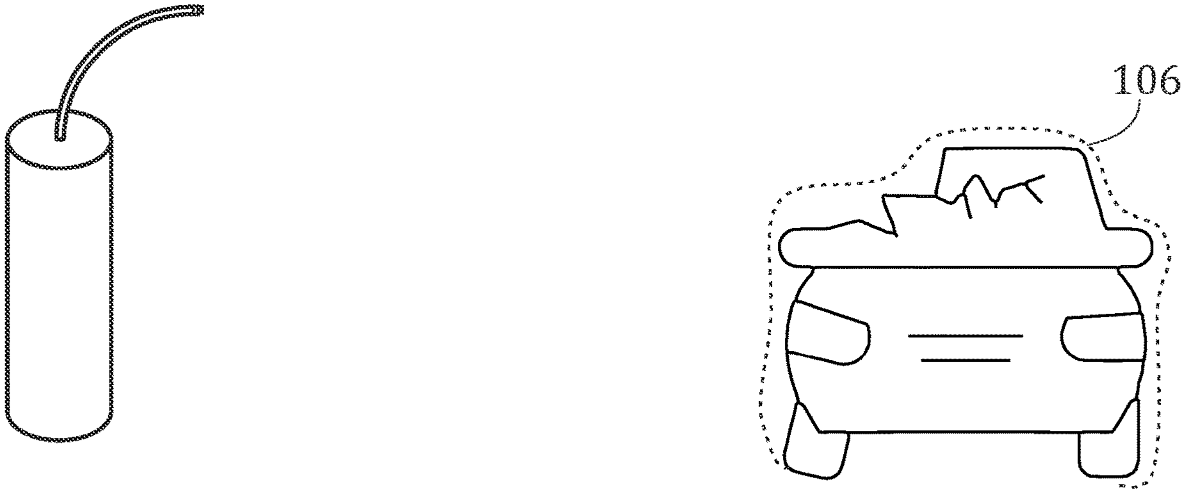

FIGS. 2A-C illustrates a method of encapsulation, thermal runaway prevention 200 according to an embodiment of the present invention. Referring now to FIGS. 2A-C, in an exemplary instance an object or substrate 201 is on fire 202. In the illustrated example the object is an electric vehicle containing at least one lithium ion battery on fire. The fire suppression composition described herein is especially suitable for battery fires, including lithium ion batteries, and other objects/materials subject to thermal runaway. More specifically, the fire suppression composition described herein is configured for extinguishing class A, B, and D fires. That said, the fire suppression composition may extinguish a fire on any object or substrate known in the art. A variation of the fire suppression composition is configured for extinguishing class C fires.

FIG. 2A illustrates the initial release of the fire suppression composition 102 from within tank 101 towards the object 201 on fire 202. The nozzle and the liquid propellant aid in the vermiculite from reaching the fire at a distance 203. Advantageously, the nozzle is a smooth aerated nozzle or smooth jet nozzle configured to create a narrow stream allowing the user to extinguish from a safe distance. In one embodiment, the maximum distance is approximately 28-30 feet. It should be understood that the selected components of the fire suppression composition are adapted for use with the previously mentioned nozzle. A special nozzle is not required with the fire suppression composition described herein.

In FIGS. 2B-C, the fire suppression composition, and particularly the vermiculite binds 105 to the object and the vermiculite expands when subjected to the heat of the fire, which encapsulates 106 the object extinguishing the fire. In one embodiment, the encapsulation is via the vermiculite particles starting to bind and connect with adjacent vermiculite particles forming an expanding crust.

In one embodiment, the mixture and properties of the fire suppression composition is a foam, having a viscosity of approximately 2400 centipoise (CPS). This enables the foam to fill the cracks, crevices, etc. of the object ensuring thermal runaway is prevented and the fire is sufficiently extinguished. In some embodiments, the range of viscosity is between 800-2400 CPS. Upon contact with the fire, the liquid propellant or a portion of the liquid propellant evaporates leaving only the vermiculite and any optional additives.

Figure 3:
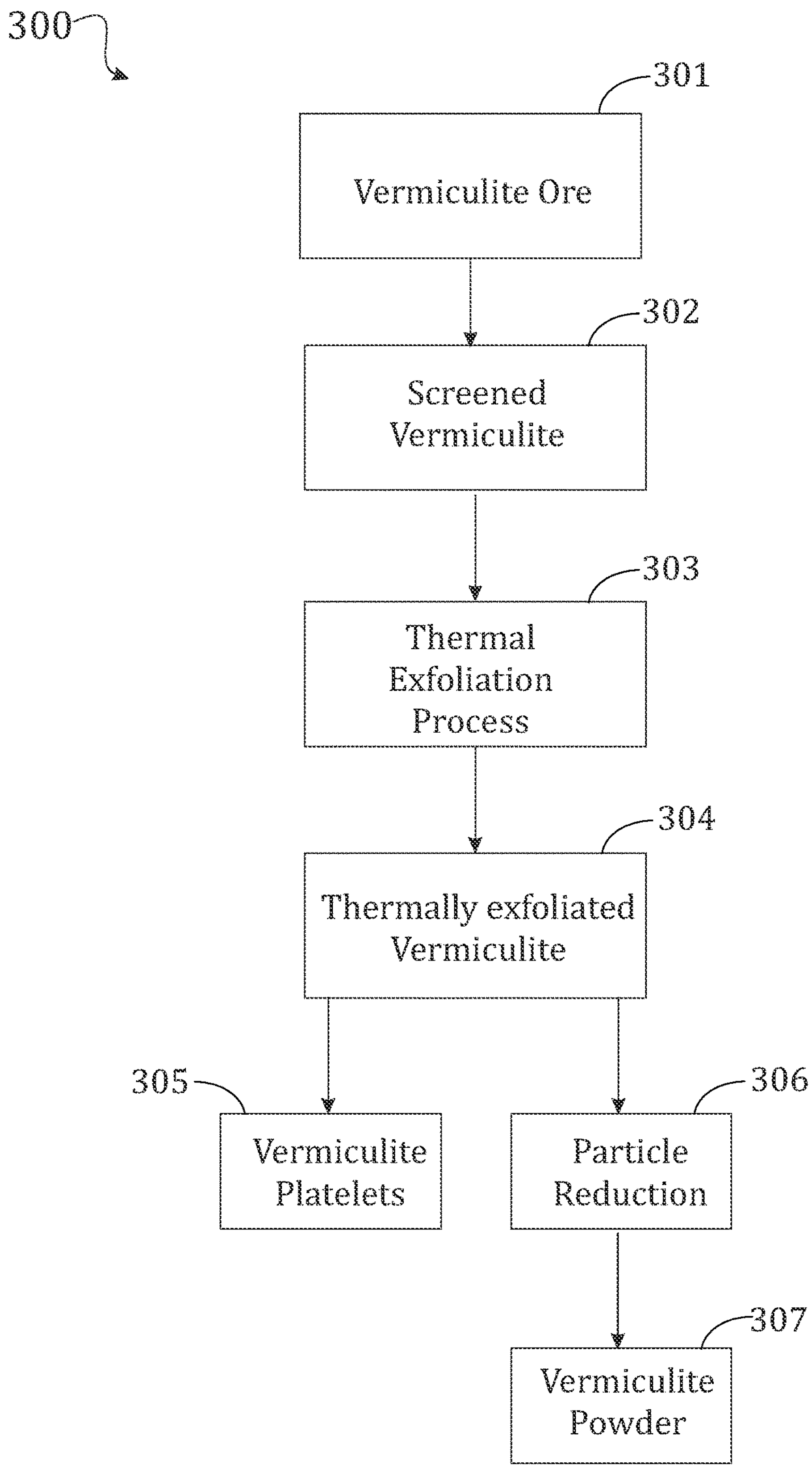
FIG. 3 is a method of vermiculite preparation according to an embodiment of the present invention.

FIG. 3 is a method of vermiculite preparation 300 according to an embodiment of the present invention. Referring now to FIG. 3, vermiculite ore is provided 301. The vermiculite ore is Micaceous Hydrated Silicate Minerals or (Magnesium Aluminum Iron Silicate) with the empirical formula Mg1.8 Fe2+0.9Al4.3SiO10(OH)2·4(H2O). Vermiculite is an odorless, highly heat and flame resistant material and has no off-gassing or smoke, and is salt-free without corrosion concerns.

Next, the vermiculite ore is screened or filtered 302 to remove other minerals or materials that may be present. Next, in step 303 the screen vermiculite is subjected to a thermal exfoliation process, via heating at a predetermined temperature, expanding and exfoliating the vermiculite 304 into lightweight porous granules or platelets 305 containing air layers. In some embodiments, the thermally exfoliated vermiculite 304 is particle reduced 306 into a vermiculite powder 307. When the thermally exfoliated vermiculite is in platelets or powdered form it is ready to be added to the fire suppression composition. It is critical that a thermal exfoliation process is used, rather than a chemical exfoliation process, as the fire suppression composition is chemical free and non-toxic. Further, the fire suppression is biodegradable.

Figure 4:
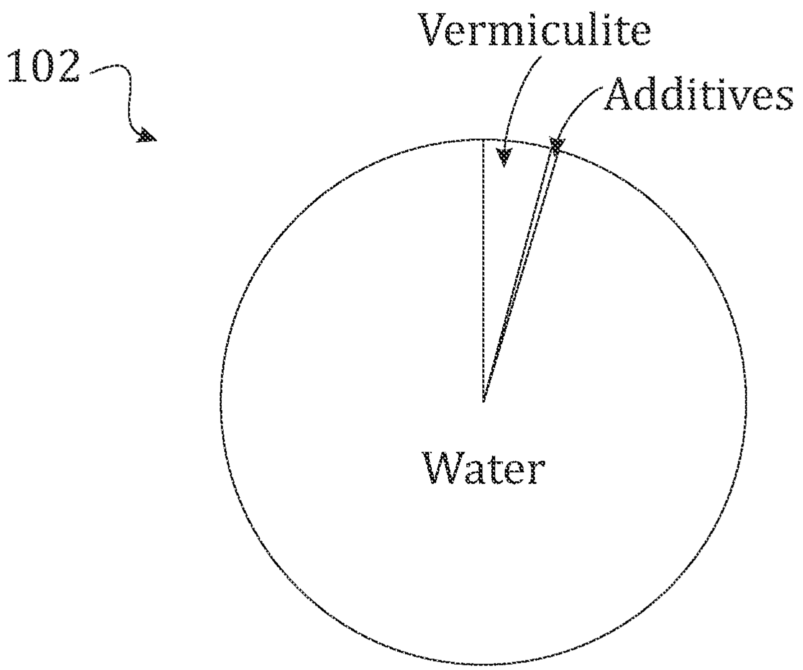
FIG. 4 is a fire suppression composition according to an embodiment of the present invention.
Figure 5:
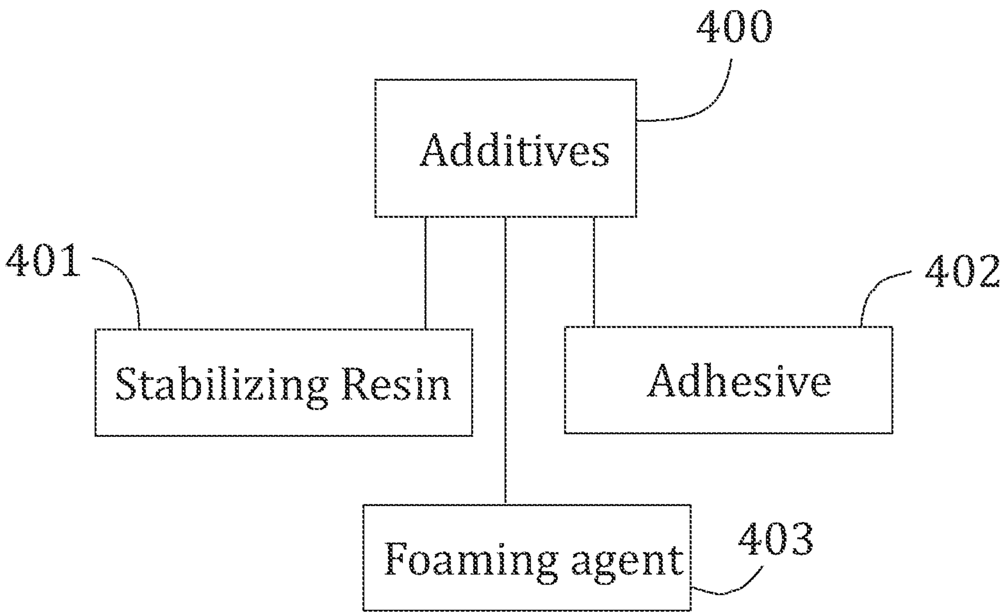
FIG. 5 defines optional additives to the fire suppression composition according to an embodiment of the present invention.

Referring now to FIGS. 4-5, a breakdown of the fire suppression composition 102 according to weight percentages is illustrated. In one embodiment, the fire suppression composition is mostly water, acting as a liquid propellant, as previously discussed. The remaining materials or the active ingredients, the vermiculite and the optional additives are the minority materials of the fire suppression composition. In one embodiment, the fire suppression composition comprises 5-20% thermally exfoliated vermiculite and 80-95% water by weight. Advantageously, in some embodiments, the use of one or move additives 400, accounting for less than 1% of the fire suppression composition by weight, help provide enhancing qualities including but not limited to consistency, adhesion, flexility, and efficiency. For example, in one embodiment, the additive helps reduce the amount of vermiculite needed by surrounding the surface of each vermiculite particle or platelet. In another embodiment, a foaming agent 403 additive is added to create the fire suppression composition into a foam consistency. In one embodiment, a glycerin is used. In another embodiment, an adhesive 402 is used. This helps bind the foam onto the object as previously discussed and reduces the amount of vermiculite needed. In this case, the fire suppression composition comprises 1-10% thermally exfoliated vermiculite and 90-99% water by weight. In some embodiments, a stabilizing resin 501 is used, such as cactus juice, forming a stabilizing film on the vermiculite platelets. In yet another embodiment, the additive is natural polysaccharide fire retardant or hydrocolloid fire retardant, such as xanthan gum or guar gum. It is important that the one or more selected additives are chemical free, non-toxic, non-flammable, and biodegradable.

In some embodiments, the additive acts as a chemical free or natural surfactant adjusting the surface tension and/or surface area properties of the fire suppression composition, allowing the composition, and particularly the vermiculite, to expand on the object or substrate at a higher rate than would otherwise. Not only does this help the performance of the fire suppression composition, it also helps reduce the amount of vermiculite needed, as the surface area increases, lowering the cost of the fire suppression composition, ultimately reducing the cost, enabling the system to be more widely adopted by agencies, including, but not limited to, cities, fire stations, the public, etc. to help control and reduce fires. It should be understood that the surface tension and/or surface tension properties may be reduced or increased via the surfactant to provide desired results, i.e. increased adhesion, increased surface area, etc.

In some embodiments, a pre-activation catalyst may be added to the fire suppression composition prior to the fire suppression composition from being released from within the tank. For the purposes of this disclosure and the claims, the term additives includes a pre-activation catalyst. The pre-activation catalyst is configured to change the properties of the vermiculite and/or any of the optional additives added to the fire suppression composition. For instance, when the pre-activation catalyst is added, it starts to expand, harden, and/or change the properties of the vermiculite and/or additive(s) prior to use (within the holding tank). The preactivation is a useful step providing fire fighting advantages, including but not limited to, increasing encapsulation performance and thermal runaway prevention. It should be understood that the use of a pre-activation catalyst is optional.

Figure 6:
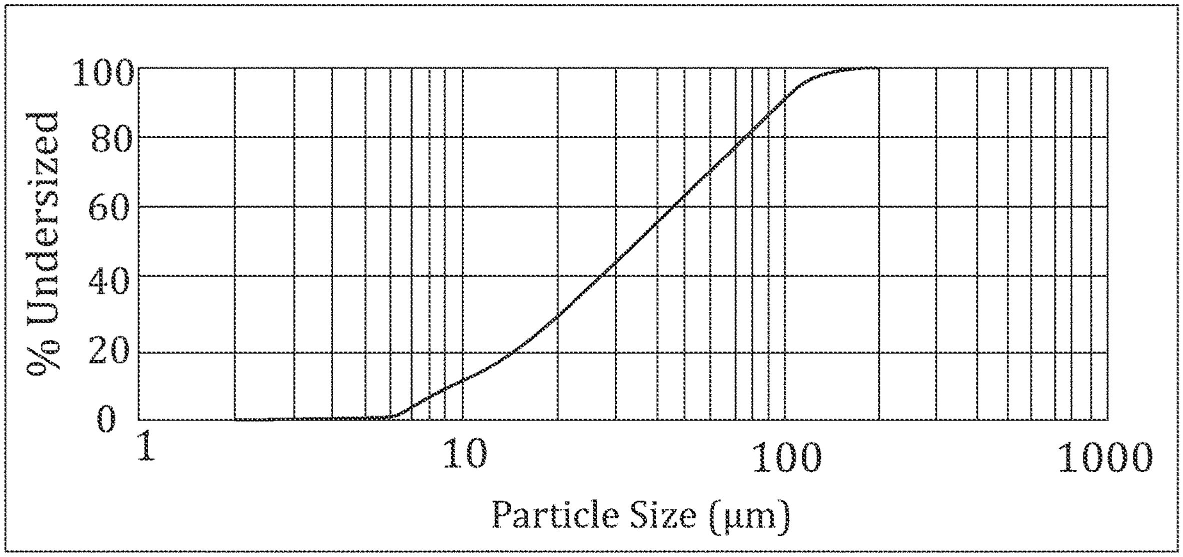
FIG. 6 is a particle size distribution chart of the vermiculite according to an embodiment of the present invention.
Figure 7:
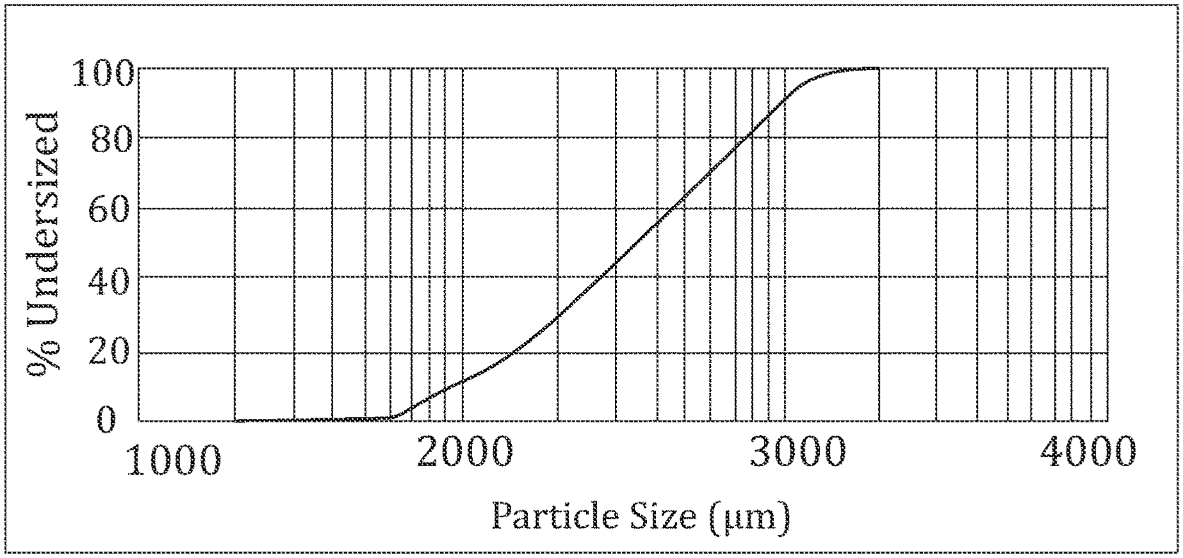
FIG. 7 is a particle size distribution chart of the vermiculite according to an embodiment of the present invention.
Figure 8:
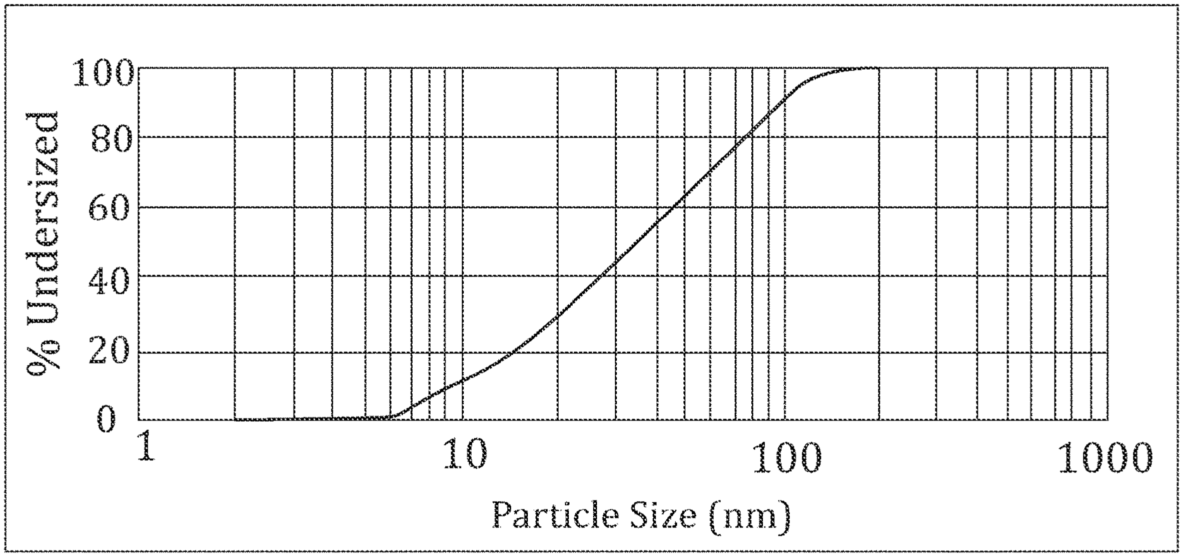
FIG. 8 is a particle size distribution chart of the vermiculite according to an embodiment of the present invention.

In some embodiments, the fire suppression composition is a stable dispersion of expanded vermiculite platelets (via the exfoliation process) suspended in water. As shown in FIG. 6, in some embodiments, the particle size of the expanded vermiculite platelets are an average size of approximately 50 micrometers, and range from 1 to 100 micrometers in size. However, in other embodiments, as seen in FIG. 7, the particle size of the expanded vermiculite platelets are an average size of approximately 2500 micrometers, and range from 2000 to 3000 micrometers in size. In some embodiments, the expanded vermiculite platelets are greater than 2000 micrometers ensuring larger expansion when exposed to heat (via the fire) providing an excellent thermal encapsulator for large fires. Yet, in other embodiments, as seen in FIG. 8, the particle size of the expanded vermiculite platelets are reduced to nano size, wherein the average size is approximately 50 nanometers with a range of 5-100 nanometers.

Figure 9:
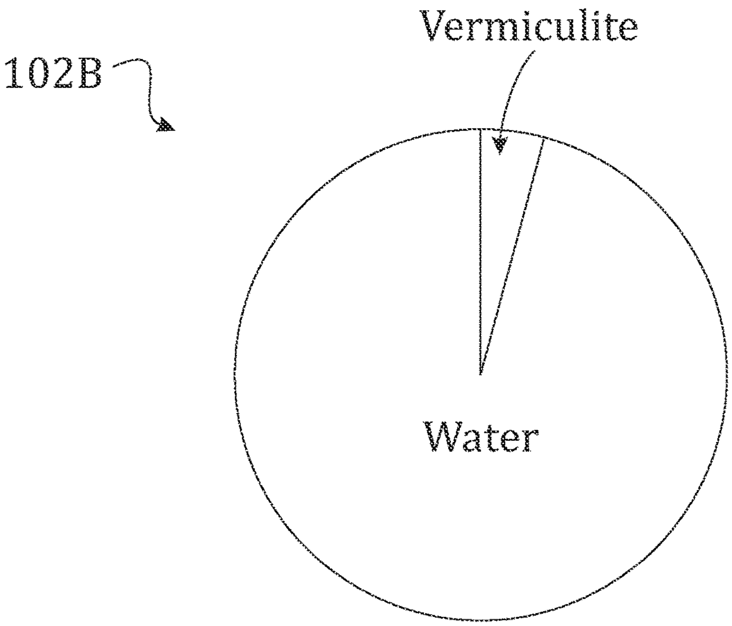
FIG. 9 is a first alternate fire suppression composition according to an embodiment of the present invention.
Figure 10:
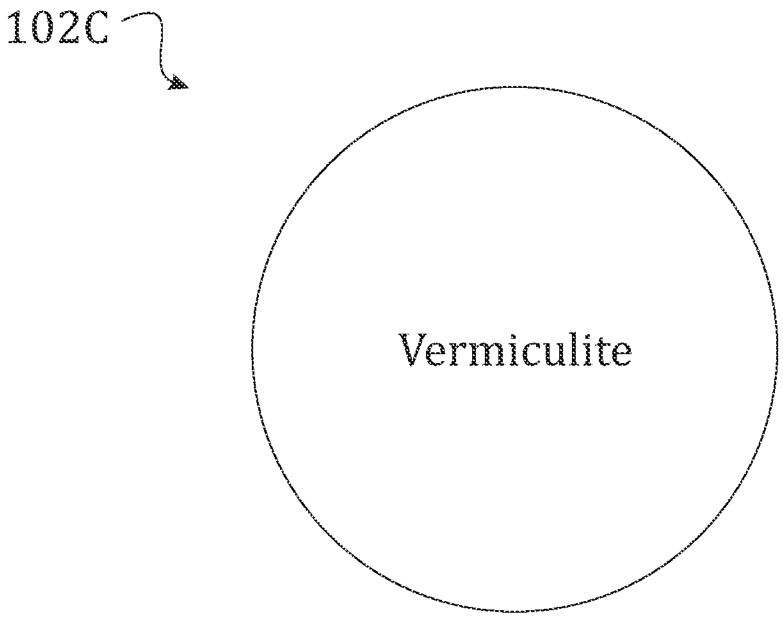
FIG. 10 is a second alternate fire suppression composition according to an embodiment of the present invention; and, FIG. 11 is a third alternate fire suppression composition according to an embodiment of the present invention.
Figure 11:
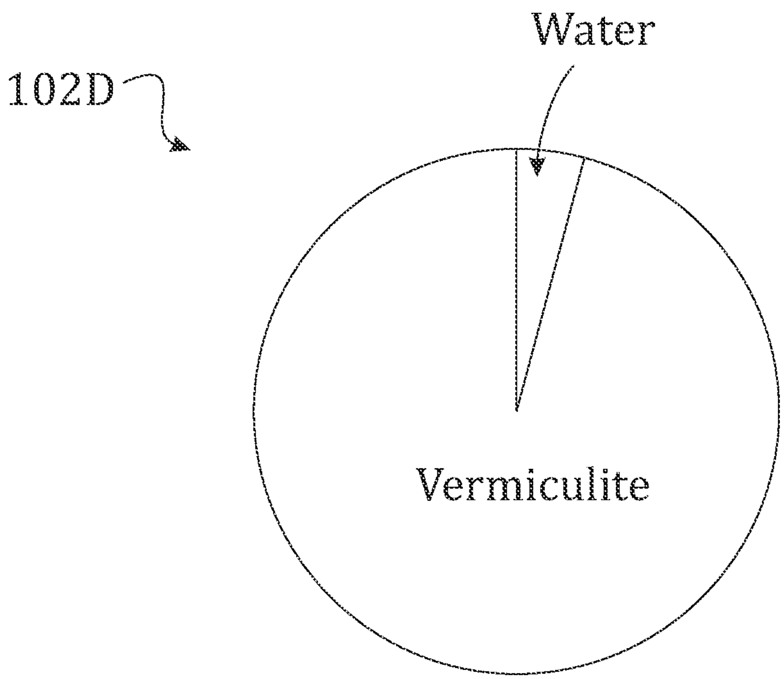

As previously mentioned, the performance additives are optional components. In some embodiments, as seen in FIG. 9, the fire suppression composition 102B is only vermiculite and water with no other substances. In this embodiment, the vermiculite has the same properties as previously discussed. In other embodiments, as seen in FIG. 10, the fire suppression composition 102C is 100% pure vermiculite powder, wherein the powder is configured to be dumped without the use of a propellant, such as from an airplane or used in a restaurant fire suppression system, or similar applications. In yet in other embodiments, as seen in FIG. 11, the fire suppression competition 102D is mostly vermiculite, such as vermiculite powder, with a small amount of water. For example, in one embodiment, the fire suppression composition comprises 80-95% exfoliated vermiculite and 5-20% water by weight.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention. For example, the fire suppression composition may be solidified into structure, mixed and bonded within a solid structure, injection-molded, etc. to create fire preventative properties for the solid structure. This includes hard materials as well as flexible materials, including but not limited to, building materials, such as wall, insulation, siding, roofing materials, pipes, and conduits, computer equipment, battery housing, smartphones, laptops, and their cases, as well as other consumer products, and other substances that have fire risks. Further, the fire suppression composition may be infused, mixed, or integrated into paints, resins, epoxies, coatings, sealants, and similar materials.

For the purposes of this patent, 'chemical-free' refers to products or processes that do not involve the intentional addition or use of synthetic chemicals, synthetic additives, synthetic preservatives, or similar synthetic substances typically deemed artificial or non-naturally occurring. This includes, but is not limited to, synthetic dyes, artificial fragrances, preservatives, detergents, pesticides, and plasticizers. It is understood that this term does not suggest the absence of all chemicals, given that all matter is fundamentally composed of chemicals. Instead, it signifies the intent to minimize the product or process's potential for harm, toxicity, or adverse environmental impact commonly associated with certain synthetic or industrially-produced chemicals. However, this definition may include substances that fall outside the above definition if their addition is deemed safe and listed in the Organic Materials Review Institute (OMRI). For example, in some embodiments, a nitrogenous phosphate salt is included in the composition. In some embodiments, the nitrogenous phosphate salt is a diammonium phosphate (DAP).

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A fire suppression composition comprising:

particle reduced thermally exfoliated vermiculite in powdered form having a particle size ranging from 5-100 micrometers;

a liquid propellent;

a fire retardant hydrocolloid additive;

a nitrogenous phosphate salt; and, wherein the fire suppression composition is biodegradable.

2. The fire suppression composition of claim 1, wherein the fire suppression composition comprises 5-20% thermally exfoliated vermiculite and 80-95% liquid propellant by weight.

3. The fire suppression composition of claim 1, wherein the liquid propellant is water.

4. The fire suppression composition of claim 1, further comprising an adhesive, wherein the adhesive is configured to reduce an amount of thermally exfoliated vermiculite needed for the composition.

5. The fire suppression composition of claim 4, wherein the fire suppression composition comprises 1-10% thermally exfoliated vermiculite and 90-99% liquid propellant by weight.

6. The fire suppression composition of claim 1, wherein the fire suppression composition is configured to be held within a fire extinguisher tank or a tank positioned in a vehicle.

7. The fire suppression composition of claim 1, further comprising a stabilizing resin, wherein the stabilizing resin is non-toxic, non-flammable, and biodegradable.

8. A fire suppression composition configured to extinguish a fire on an object, the fire suppression composition comprising:

particle reduced thermally exfoliated vermiculite in powdered form having a particle size ranging from 5-100 micrometers;

a liquid propellent; and an adhesive.

* * * * *